(12) United States Patent
Coon

(10) Patent No.: US 7,805,573 B1
(45) Date of Patent: Sep. 28, 2010

(54) MULTI-THREADED STACK CACHE

(75) Inventor: Brett W. Coon, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 794 days.

(21) Appl. No.: 11/313,448

(22) Filed: Dec. 20, 2005

(51) Int. Cl.
G06F 12/00 (2006.01)
G06F 13/00 (2006.01)
G06F 13/28 (2006.01)

(52) U.S. Cl. ........................ 711/132; 711/154; 712/202; 712/228

(58) Field of Classification Search ................. 711/132, 711/154; 712/202, 228
See application file for complete search history.

(56) References Cited

U.S. PATENT DOCUMENTS

| | | | | |
|---|---|---|---|---|
| 5,640,582 A * | 6/1997 | Hays et al. | | 712/38 |
| 6,502,184 B1 * | 12/2002 | Zhang et al. | | 712/202 |
| 6,631,452 B1 * | 10/2003 | Lin | | 711/159 |
| 7,065,613 B1 * | 6/2006 | Flake et al. | | 711/132 |
| 2002/0010733 A1 * | 1/2002 | Baba et al. | | 709/108 |
| 2002/0056024 A1 * | 5/2002 | Bui | | 711/118 |
| 2007/0074213 A1 * | 3/2007 | Ma et al. | | 718/100 |

OTHER PUBLICATIONS

Eggers, et al. "Simultaneous Multithreading: A Platform for Next-Generation Processors," *IEEE Micro*, vol. 17, No. 5, pp. 12-19, Sep./Oct. 1997.

* cited by examiner

*Primary Examiner*—Stephen C Elmore
*Assistant Examiner*—Mark A Giardino, Jr.
(74) *Attorney, Agent, or Firm*—Patterson & Sheridan, LLP

(57) ABSTRACT

Systems and methods for storing stack data for multi-threaded processing in a specialized cache reduce on-chip memory requirements while maintaining low access latency. An on-chip stack cache is used store a predetermined number of stack entries for a thread. When additional entries are needed for the thread, entries stored in the stack cache are spilled, i.e., moved, to remote memory. As entries are popped off the on-chip stack cache, spilled entries are restored from the remote memory. The spilling and restoring processes may be performed while the on-chip stack cache is accessed. Therefore, a large stack size is supported using a smaller amount of die area than that needed to store the entire large stack on-chip. The large stack may be accessed without incurring the latency of reading and writing to remote memory since the stack cache is preemptively spilled and restored.

19 Claims, 9 Drawing Sheets

MULTI-THREADED STACK CACHE

BACKGROUND OF THE INVENTION

1. Field of the Invention

Embodiments of the present invention generally relate to instruction execution for multi-threaded processing and, more specifically, to using a cache memory to store the top entries of a stack.

2. Description of the Related Art

Conventional multi-threaded processing systems use stacks to store data or subroutine return addresses in memory. Each stack is typically configured to store a large number of entries, e.g., hundreds or thousands of entries, and separate stacks are used for each processing thread. Therefore, the amount of memory needed to store the stacks on the same die as the multi-threaded processing units may increase the cost of producing the processing system. In order to reduce the cost, in some conventional systems the stack memory is not included on the same die as the multi-threaded processing units. In those systems, the latency incurred accessing the stacks may reduce processing performance of the multi-threaded processing units.

Accordingly, there is a desire to support large stack sizes for use during multi-threaded processing without reducing the processing performance due to the latency incurred while accessing the large stacks.

SUMMARY OF THE INVENTION

The current invention involves new systems and methods for storing stack data for multi-threaded processing in a specialized cache. An on-chip stack cache is used to store a predetermined number of stack entries for a thread. When additional entries are needed for the thread, entries stored in the stack cache are spilled, i.e., moved, to remote memory. As entries are popped off the on-chip stack cache, spilled entries are restored from the remote memory. The spilling and restoring processes may be performed while the on-chip stack cache is accessed. Therefore, a large stack size is supported using a smaller amount of die area than that needed in designs where the entire large stack is stored on-chip. The large stack may be accessed without incurring the latency of reading and writing to remote memory since the stack cache is preemptively spilled and restored.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Stack data used during multi-threaded processing is stored in a specialized on-chip stack cache that preemptively spills entries to and restores entries from a remote storage resource (remote memory). The spilling and restoring processes may be performed while the on-chip stack cache is accessed. Therefore, a large stack size, that includes the combined storage capacity of the on-chip stack cache and the remote memory, is supported using a smaller amount of die area than that needed to store the entire large stack on-chip.

Figure 1:
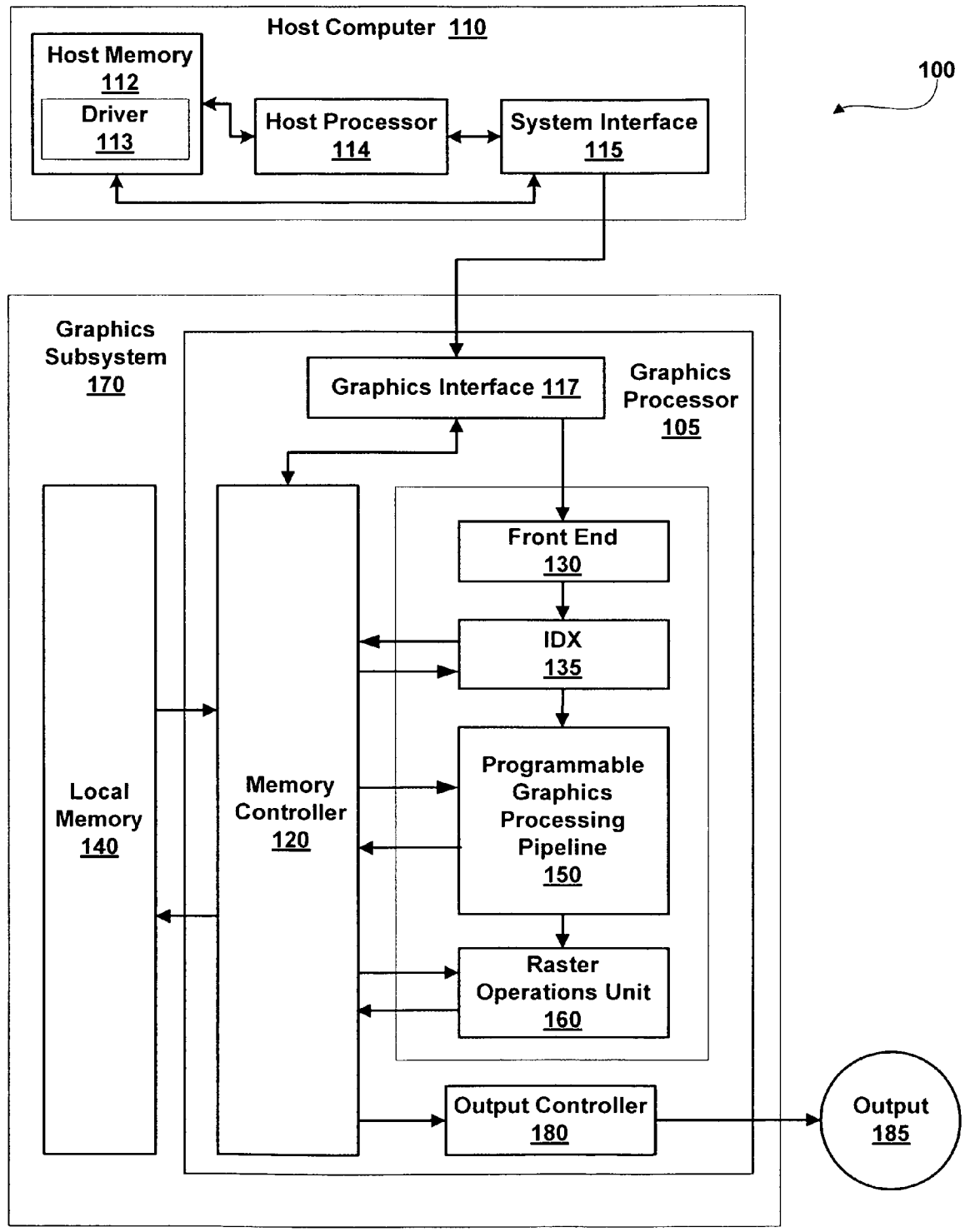
FIG. 1 illustrates a computing system including a host computer and a graphics subsystem in accordance with one or more aspects of the present invention.

FIG. 1 illustrates a computing system generally designated 100 including a host computer 110 and a graphics subsystem 170 in accordance with one or more aspects of the present invention. Computing system 100 may be a desktop computer, server, laptop computer, personal digital assistant (PDA), palm-sized computer, tablet computer, game console, cellular telephone, computer based simulator, or the like. Host computer 110 includes host processor 114 that may include a system memory controller to interface directly to host memory 112 or may communicate with host memory 112 through a system interface 115. System interface 115 may be an I/O (input/output) interface or a bridge device including the system memory controller to interface directly to host memory 112. Examples of system interface 115 known in the art include Intel® Northbridge.

A graphics device driver, driver 113, interfaces between processes executed by host processor 114, such as application programs, and a programmable graphics processor 105, translating program instructions as needed for execution by graphics processor 105. Driver 113 also uses commands to configure sub-units within graphics processor 105. Specifically, driver 113 may program registers within graphics processor 105 based on application programming interface (API) imposed limits for nesting levels that specify a maximum stack depth for use during multi-threaded processing.

Host computer 110 communicates with graphics subsystem 170 via system interface 115 and a graphics interface 117 within a graphics processor 105. Data received at graphics interface 117 can be passed to a front end 130 or written to a local memory 140 through memory controller 120. Graphics processor 105 uses graphics memory to store graphics data and program instructions, where graphics data is any data that is input to or output from components within the graphics processor. Graphics memory can include portions of host memory 112, local memory 140, register files coupled to the components within graphics processor 105, and the like.

Graphics processor 105 includes, among other components, front end 130 that receives commands from host computer 110 via graphics interface 117. Front end 130 interprets and formats the commands and outputs the formatted commands and data to an IDX (Index Processor) 135. Some of the formatted commands are used by programmable graphics processing pipeline 150 to initiate processing of data by providing the location of program instructions or graphics data stored in memory. IDX 135, programmable graphics processing pipeline 150 and a raster operations unit 160 each include an interface to memory controller 120 through which program instructions and data can be read from memory, e.g., any combination of local memory 140 and host memory 112.

IDX 135 optionally reads processed data, e.g., data written by raster operations unit 160, from memory and outputs the data, processed data and formatted commands to programmable graphics processing pipeline 150. Programmable graphics processing pipeline 150 and raster operations unit 160 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Programmable graphics processing pipeline 150 and raster operations unit 160 are each optionally configured such that data processing operations are performed in multiple passes through those units or in multiple passes within programmable graphics processing pipeline 150. Programmable graphics processing pipeline 150 and raster operations unit 160 also each include a write interface to memory controller 120 through which data can be written to memory.

In a typical implementation, programmable graphics processing pipeline 150 performs geometry computations, rasterization, and pixel computations. Therefore, programmable graphics processing pipeline 150 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like.

Samples output by programmable graphics processing pipeline 150 are passed to raster operations unit 160, which optionally performs near and far plane clipping and raster operations, such as stencil, z test, and the like, and saves the results or the samples output by programmable graphics processing pipeline 150 in local memory 140. When the data received by graphics subsystem 170 has been completely processed by graphics processor 105, an output 185 of graphics subsystem 170 is provided using an output controller 180. Output controller 180 is optionally configured to deliver data to a display device, network, electronic control system, other computing system 100, other graphics subsystem 170, or the like. Alternatively, data is output to a film recording device or written to a peripheral device, e.g., disk drive, tape, compact disk, or the like.

Figure 2:
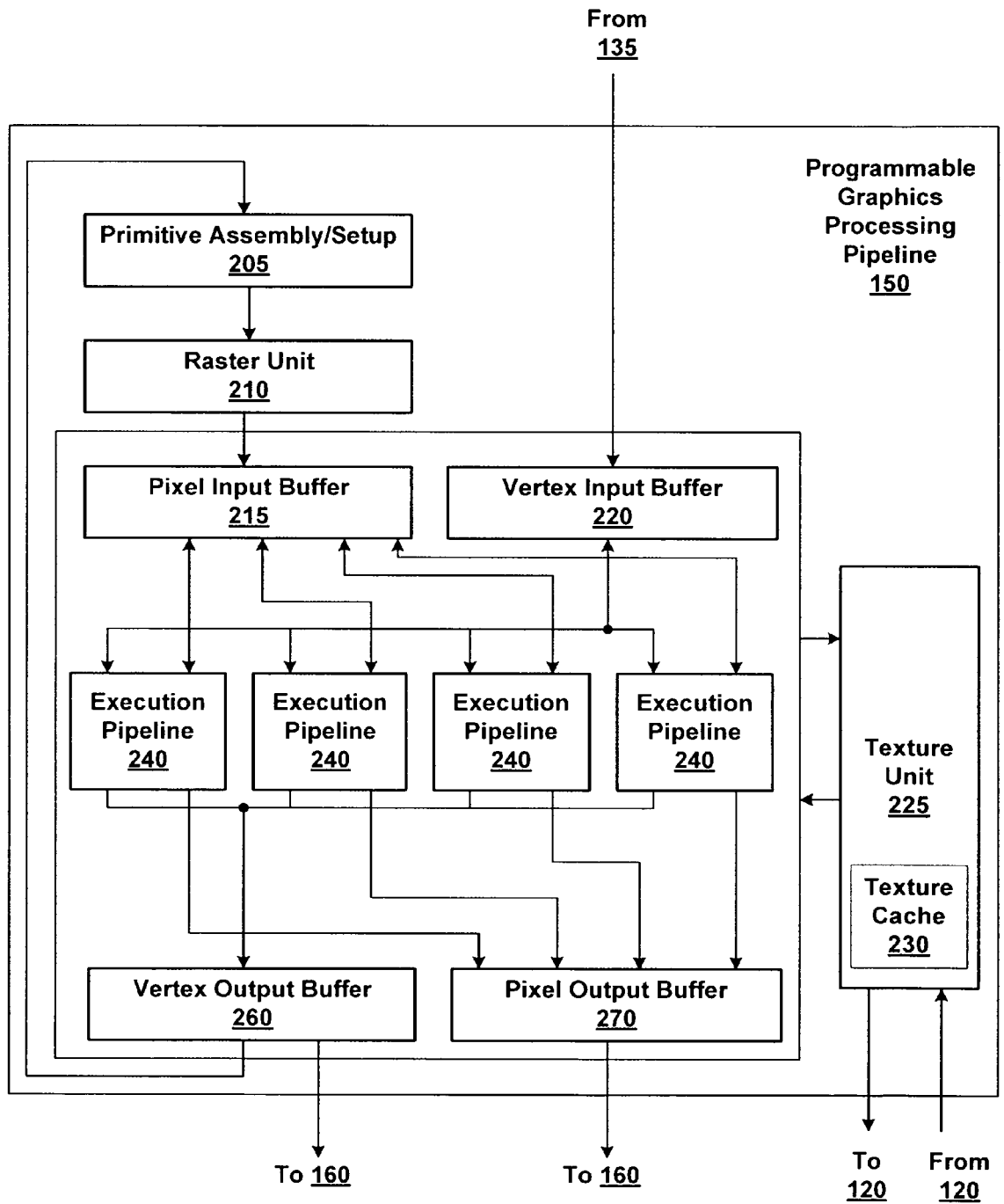
FIG. 2 illustrates the programmable graphics processing pipeline of FIG. 1 in accordance with one or more aspects of the present invention.

FIG. 2 illustrates programmable graphics processing pipeline 150 of FIG. 1 in accordance with one or more aspects of the present invention. At least one set of samples is output by IDX 135 and received by programmable graphics processing pipeline 150 and the at least one set of samples is processed according to at least one program, the at least one program including graphics program instructions. A program can process one or more sets of samples. Conversely, a set of samples can be processed by a sequence of one or more programs.

Samples, such as surfaces, primitives, or the like, are received from IDX 135 by programmable graphics processing pipeline 150 and stored in a vertex input buffer 220 including a register file, FIFO (first in first out), cache, or the like (not shown). The samples are broadcast to execution pipelines 240, four of which are shown in FIG. 2. Each execution pipeline 240 includes at least one multi-threaded processing unit, to be described further herein. The samples output by vertex input buffer 220 can be processed by any one of the execution pipelines 240. A sample is accepted by an execution pipeline 240 when a processing thread within the execution pipeline 240 is available to process the sample. Each execution pipeline 240 signals to vertex input buffer 220 when a sample can be accepted or when a sample cannot be accepted. In one embodiment of the present invention, programmable graphics processing pipeline 150 includes a single execution Pipeline 240 containing one multi-threaded processing unit. In other embodiments of the present invention, programmable graphics processing pipeline 150 includes a plurality of execution pipelines 240.

Execution pipelines 240 may receive first samples, such as higher-order surface data, and tessellate the first samples to generate second samples, such as vertices. Execution pipelines 240 may be configured to transform the second samples from an object-based coordinate representation (object space) to an alternatively based coordinate system such as world space or normalized device coordinates (NDC) space. Each execution pipeline 240 may communicate with texture unit 225 using a read interface (not shown in FIG. 2) to read program instructions, spilled stack data, and graphics data such as texture maps from local memory 140 or host memory 112 via memory controller 120 and a texture cache 230. Texture cache 230 is used to improve memory read performance by reducing read latency. In one embodiment of the present invention, texture cache 230 is omitted. In another embodiment of the present invention, a texture unit 225 is included in each execution pipeline 240. Alternatively, each execution pipeline 240 has a dedicated instruction read interface to read program instructions from local memory 140 or host memory 112 via memory controller 120.

Execution pipelines 240 output processed samples, such as vertices, that are stored in a vertex output buffer 260 including a register file, FIFO, cache, or the like (not shown). Processed vertices output by vertex output buffer 260 are received by a primitive assembly/setup unit 205. Primitive assembly/setup unit 205 calculates parameters, such as deltas and slopes, to rasterize the processed vertices and outputs parameters and samples, such as vertices, to a raster unit 210. Raster unit 210 performs scan conversion on samples, such as vertices, and outputs samples, such as fragments, to a pixel input buffer 215. Alternatively, raster unit 210 resamples processed vertices and outputs additional vertices to pixel input buffer 215.

Pixel input buffer 215 outputs the samples to each execution pipeline 240. Samples, such as pixels and fragments, output by pixel input buffer 215 are each processed by only one of the execution pipelines 240. Pixel input buffer 215 determines which one of the execution pipelines 240 to output each sample to depending on an output pixel position, e.g., (x,y), associated with each sample. In this manner, each sample is output to the execution pipeline 240 designated to process samples associated with the output pixel position. In an alternate embodiment of the present invention, each sample output by pixel input buffer 215 is processed by one of any available execution pipelines 240.

Each execution pipeline 240 signals to pixel input buffer 215 when a sample can be accepted or when a sample cannot be accepted. Program instructions configure programmable computation units (PCUs) within an execution pipeline 240 to perform operations such as tessellation, perspective correction, texture mapping, shading, blending, and the like. Processed samples are output from each execution pipeline 240 to a pixel output buffer 270. Pixel output buffer 270 optionally stores the processed samples in a register file, FIFO, cache, or the like (not shown). The processed samples are output from pixel output buffer 270 to raster operations unit 160.

Figure 3A:
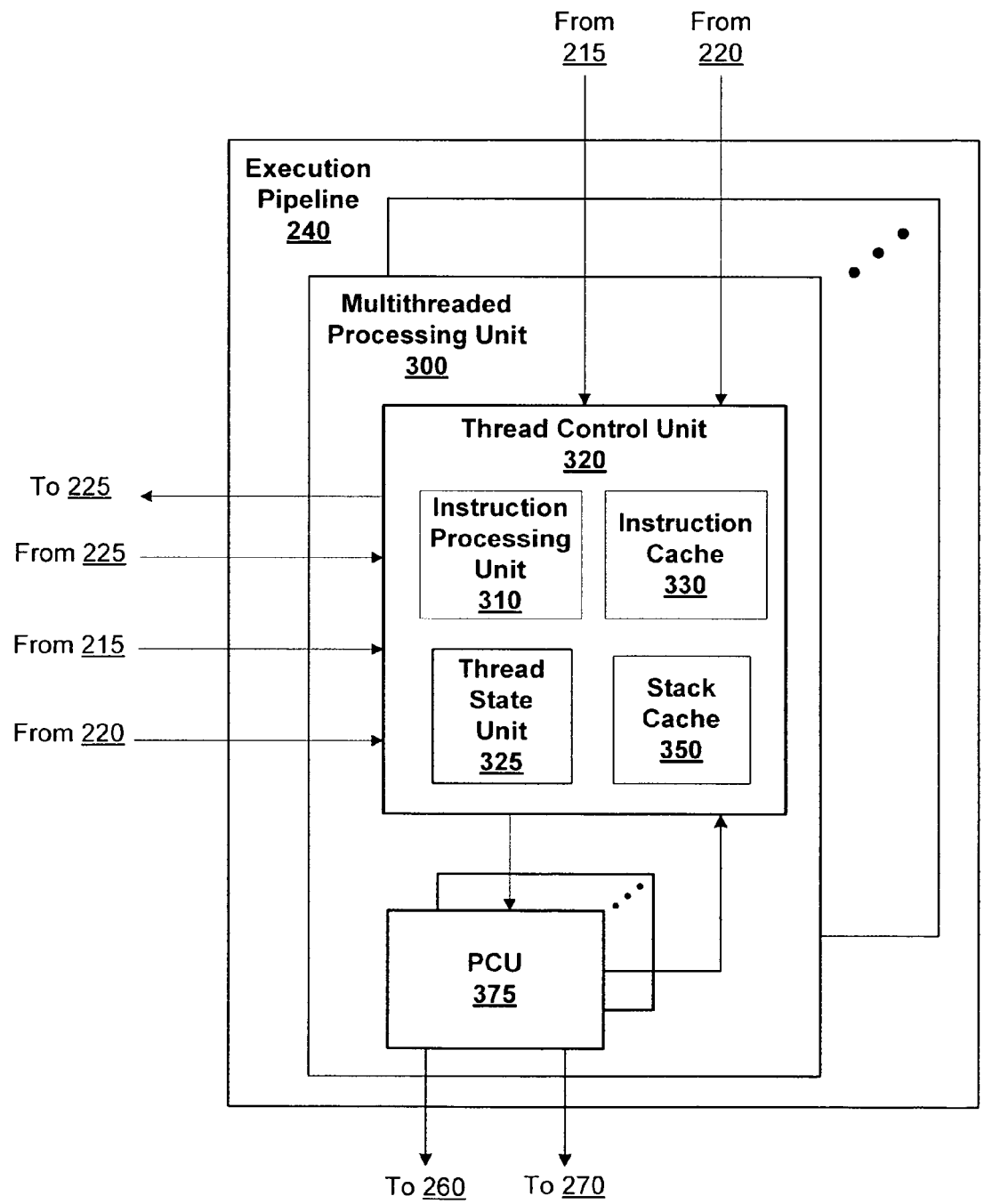
FIG. 3A illustrates the execution pipeline of FIG. 2 in accordance with one or more aspects of the present invention.

FIG. 3A illustrates execution pipeline 240 of FIG. 2, including at least one multithreaded processing unit 300, in accordance with one or more aspects of the present invention. An execution pipeline 240 can contain a plurality of multi-threaded processing units 300, with each multithreaded processing unit 300 containing at least one PCU 375. PCUs 375 are configured using program instructions read by a thread control unit 320 via texture unit 225. Thread control unit 320 gathers source data specified by the program instructions and dispatches the source data and program instructions to at least one PCU 375. PCUs 375 perform computations specified by the program instructions and output data to at least one destination, e.g., pixel output buffer 160, vertex output buffer 260 and thread control unit 320.

One characteristic of the system disclosed in FIGS. 1, 2, and 3A is that it may be configured to embody a SIMD (single instruction multiple data) architecture, where a thread is assigned to each sample processed in the one or more execution pipelines 240. Therefore, a single program may be used to process several sets of samples. Thread control unit 320 receives samples or pointers to samples stored in pixel input buffer 215 and vertex input buffer 220. Thread control unit 320 receives a pointer to a program to process one or more of the samples.

In one embodiment of the present invention, thread control unit 320 assigns a thread (threadID) to each sample to be processed. A thread includes a pointer to a program instruction (program counter), such as the first instruction within the program, thread state information, and storage resources for storing intermediate data generated when processing the sample. In other embodiments of the present invention, rather than assigning a different threadID to each thread, thread control unit 320 assigns a threadID to several threads that are processed as a group. However, there are points in a program (i.e., branches) where threads in a thread group are allowed to "diverge" from one another so that one or more threads may execute instructions on their respective samples that do not need to be executed by the other threads in the thread group. Divergent threads in a thread group may be synchronized at various points in the program to guarantee that some level of synchronized processing may be achieved at those points. Once all of the threads in the thread group are synchronized, the threads resume execution in lock-step, i.e. each sample is processed by the same sequence of instructions in a SIMD manner.

Instruction processing unit 310 uses the program counter for each thread to read program instructions from instruction cache 330 to execute the thread. When a requested program instruction is not available in instruction cache 330 it is read (possibly along with other program instructions stored in adjacent memory locations) from graphics memory via texture unit 225. A base address, corresponding to the graphics memory location where a first instruction in a program is stored, may be used in conjunction with a program counter to determine the location in graphics memory where a program instruction corresponding to the program counter is stored. In an alternate embodiment of the present invention, instruction cache 330 can be shared between multithreaded processing units 300 within execution pipeline 240.

Instruction processing unit 310 receives the program instructions from instruction cache 330 and executes branch instructions using stack cache 350. In one embodiment, there are five types of branch instructions: conditional branch instructions, call instructions, PreBreak instructions, return instructions and break instructions. Alternative embodiments may include more or fewer types of branch instructions as well as different types of branch instructions. Call, PreBreak, and divergent conditional branches all push entries onto cache stack 350, while return, break, and branch synchronization instructions all pop entries from cache stack 350.

Execution of a call instruction results in a program counter changing to a different value, either earlier or later in the program, and the current program counter is pushed onto stack cache 350. Conversely, when a return instruction is executed the program counter is popped from stack cache 350. A PreBreak branch enables a specific loop of instructions to be executed. In the program, the first instruction in this loop typically follows the PreBreak instruction (i.e., the first instruction in the loop is the fall-through instruction). Therefore, the threads executing the PreBreak branch do not have to branch to a specific instruction to execute the loop of instructions, as is necessary with conditional branches and call/return branches. Rather, the threads simply execute the next instruction in the program to begin executing the loop in the PreBreak branch. State information about the threads that execute the PreBreak branch as well as after-loop address information is pushed onto stack cache 350 when a PreBreak branch instruction is executed. The after-loop address information is popped from the stack when a break instruction is executed at the end of the PreBreak loop.

For execution of other instructions (not branch instructions) source data is gathered and the program instruction is output to one of the PCUs 375 for execution. The source data may be read from pixel input buffer 215, vertex input buffer 220, local memory 140, host memory 112, or the like. Processed samples are output to a destination specified by the instruction. The destination may be vertex output buffer 260, pixel output buffer 270, or registers within multithreaded processing unit 300. Alternatively, the destination may also include local memory 140, host memory 112, or the like.

When operating in a synchronized mode, each thread being processed by a particular multi-threaded processing unit 300 independently executes the same operations (or instructions) on its respective sample. This type of synchronized processing is advantageous because, among other things, it allows groups of like samples to be processed simultaneously, which increases graphics processing efficiency.

In one embodiment, execution pipeline 240 may be configured to simultaneously process twenty-four independent thread groups. The different thread groups may be simultaneously processed in a MIMD (multiple instruction multiple data) manner relative to each other since each thread group may be processed by a different program or a different portion of the same program. In one embodiment, each thread group may include up to thirty-two threads. A particular multi-threaded processing unit 300 within execution pipeline 240 may process one or more such thread groups.

Thread state information representing the current state of each thread being executed is stored in a thread state unit 325. Thread state unit 325 may be a register file, FIFO memory, circular buffer, or the like. Thread state unit 325 is configured to maintain an active mask and an active program counter for each of the thread groups processed by multithreaded processing unit 300. The active mask is a string of bits that indicates which threads in the thread group are currently active (i.e., currently executing instructions). Each bit in the active mask corresponds to one thread in the thread group. In one embodiment, a bit is set if its corresponding thread is active. Thus, when all bits in the active mask are set, multithreaded processing unit 300 is operating in fully synchronized mode for execution of the thread group associated with the active mask. The active program counter indicates the address of the instruction in the program currently being executed by the active threads.

As the multithreaded processing unit processes instructions in the program, it may encounter one or more branch instructions. When a branch instruction is encountered, instruction processing unit 310 may push thread execution data onto stack cache 350 that includes the current program counter. The thread execution data may also include state information related to various threads in the thread group, such as an active mask. After pushing the thread execution data onto stack cache 350, instruction processing unit 310 may disable certain threads in the thread group, while keeping the other threads active. The active threads then execute the instructions associated with the branch. Again, the type of branch instruction encountered may determine which threads, if any, in the thread group are disabled and which threads remain active.

For example, when a call branch instruction is executed, a call thread execution data is pushed onto the stack that includes state information about the threads that execute the call/return branch as well as return address information. Specifically, the call thread execution data includes an active mask and a "return" program counter. The active mask indicates which threads are active when the call instruction is encountered. Because call instructions are not conditional, there are no thread divergences associated with a call/return branch. Thus, the active mask included in the call thread execution data also indicates which threads execute the call/return branch. The return program counter provides a return address for the threads that execute the call/return branch and reflects the address of the instruction in the program subsequent to the call instruction (i.e., the fall-through instruction).

In another example, when a PreBreak branch instruction is executed, break thread execution data is pushed onto the stack that includes state information about the threads that execute the PreBreak branch as well as after-loop address information. Specifically, the break thread execution data includes an active mask and an "after-loop" program counter. Similar to call instructions, PreBreak instructions are not conditional. Therefore, the active mask included in the break thread execution data not only indicates the threads that are active when the PreBreak instruction is encountered, but also the threads that execute the PreBreak branch. The after-loop program counter reflects the address of the instruction that the threads execute after executing a break instruction in the code following the PreBreak branch.

Stack cache 350 enables divergence and flow control information to be stored and accessed in a way that precludes this information from being overwritten, regardless of the number of thread divergences that occur or the number of nested conditions that exist in a program. The actual number of divergences and nesting levels that can be supported is, of course, limited by the size of the stack (the combined size of stack cache 350 and any memory storing spilled stack thread data) used to store the divergence and flow control information (which is described in further detail below) as well as the SIMD width of the particular thread group. Regardless of the size of the memory stack, however, the system and method are robust. For example, driver 113 or a compiler may be configured to ensure that the stack depth is not exceeded for a particular program, thereby avoiding problems related to memory stack size limitations.

When a branch, call, or PreBreak instruction is encountered, instruction processing unit 310 determines whether the instruction includes a set-synchronization bit (also called a "set-sync bit"). A set-synchronization bit indicates that a thread divergence may occur due to the branch. If the instruction includes a set-synchronization bit, instruction processing unit 310 pushes a synchronization thread execution data onto stack cache 350 before processing the instruction. The synchronization thread execution data includes state information related to the threads that were active when the branch instruction was first encountered. When a synchronization thread execution data is popped from the stack, the threads that were active when the branch instruction was first encountered are synchronized.

If some but not all of the active threads take the branch, then a thread divergence occurs, and instruction processing unit 310 pushes divergence thread execution data onto stack cache 350. The divergence thread execution data includes state information about the threads that do not take the branch (i.e., the threads for which the inverted condition is not satisfied). When instruction processing unit 310 executes a call instruction, call thread execution data is pushed onto stack cache 350 that includes state information about the threads that execute the call/return branch as well as return address information. Specifically, the call thread execution data includes an active mask and a "return" program counter. The active mask indicates which threads are active when the call instruction is encountered. When the call instruction includes a set-synchronization thread execution data, instruction processing unit 310 pushes a synchronization thread execution data is pushed onto stack cache 350.

When a branch instruction is a return or break instruction, then the end of a subroutine associated with a call/return branch or the end of a loop of instructions associated with a PreBreak branch has been reached and instruction processing unit 310 pops from the stack the thread execution data on the top of the stack and sets the active mask equal to the mask included in the popped thread execution data and sets the active program counter to the program counter included in the popped thread execution data. If the branch instruction is a return instruction, then the popped thread execution data will be a call thread execution data that was pushed by the call instruction. Specifically, the call thread execution data includes a return address, e.g. the address and active mask information for the instruction after the original call instruction.

Some instructions may include a pop-synchronization bit that has the opposite meaning of a set-synchronization bit. A pop-synchronization bit indicates that the threads that have diverged since the last synchronization thread execution data was pushed onto stack cache 350 are to be executed to the address of the instruction that includes the pop-synchronization bit in order to reestablish the level of thread synchronization that existed when this last synchronization thread execution data was pushed onto stack cache 350. In other words, the process will reestablish the level of thread synchronization that existed when the last branch instruction including a set-synchronization bit was encountered.

The stack cache 350 is a storage mechanism that operates in a last-in, first-out fashion and comprises a logical collection of hardware-managed sixty-four bit thread execution data, which are described in further detail below in conjunction with FIG. 3B. One independent stack is associated with one thread group. As will become apparent in the descriptions of FIGS. 5A, 5B, and 5C, stack cache 350 is populated with thread execution data (i.e., thread execution data are pushed onto the stack) and unwound (i.e., thread execution data are popped from the stack) in a way that precludes any thread execution data from being overwritten, regardless of the number of divergences that occur or the number of nesting levels that exist in the program. Further, the operation of stack cache 350 in combination with the information included in the different types of thread execution data provide an efficient mechanism for executing the various instructions in a program having several branches and for synchronizing threads as they navigate the different branches of that program.

Figure 3B:
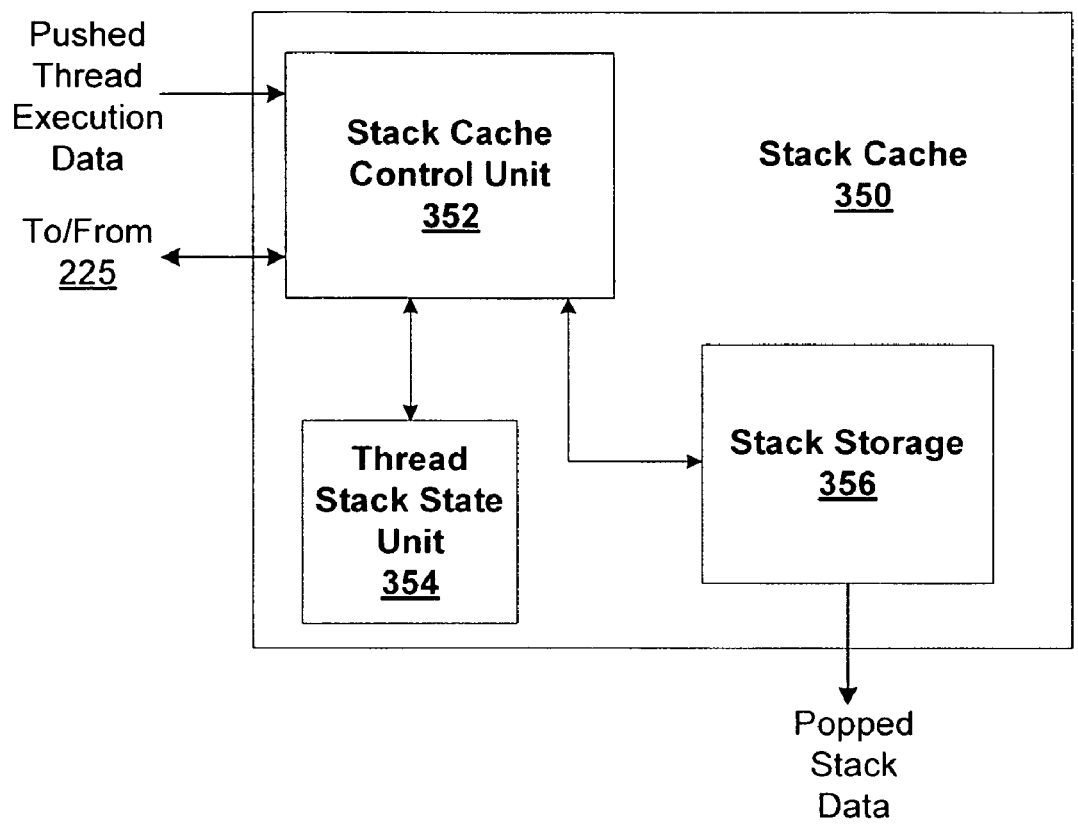
FIG. 3B illustrates the stack cache of FIG. 3A in accordance with one or more aspects of the present invention.

FIG. 3B illustrates stack cache 350 of FIG. 3A, in accordance with one or more aspects of the present invention. A stack cache control unit 352 receives thread execution data, from instruction processing unit 310. Stack cache control unit 352 pushes and pops this thread execution data from a stack storage 356. Stack storage 356 includes stack entries for each thread group, where each thread group has an equal number of entries. Stack cache control unit 352 moves thread execution data from stack storage 356 to a remote memory via texture unit 225 as needed to spill thread execution data. Stack cache control unit 352 also moves thread execution data from the remote memory via texture unit 225 to stack storage 356 as needed to restore spilled thread execution data. Examples of remote memory include local memory 140 and host memory 112.

A thread stack state unit 354 stores a counter for each thread group (threadID) indicating the number of stack entries in stack storage 356 that store pushed thread execution data for the particular thread group. The counter for each threadID is updated by stack cache control unit 352 as thread execution data is pushed to and popped from stack storage 356. Thread stack state unit 354 also stores a head entry pointer for each threadID. Like the counter, the head entry pointer for a particular threadID is updated by stack cache control unit 352 as thread execution data for the threadID is pushed to and popped from stack storage 356. Finally, thread stack state unit 354 stores a valid flag and a dirty flag for each entry in stack storage 356. In some embodiments of the present invention, the valid and dirty flags are stored for sets of entries for a single threadID. For example, a valid and dirty flag may be stored for each set of four entries representing a "thread set," as described in conjunction with FIG. 4C.

The valid flag indicates that unpopped thread execution data is stored in the entry. The valid flag is asserted when thread execution data is pushed to the entry and is negated when thread execution data is popped from the entry. The dirty flag indicates whether or not the thread execution data stored in the entry has been spilled to the remote memory portion of the stack. The dirty flag is asserted when thread execution data is pushed to the entry and is negated when the thread execution data is spilled to the remote memory. Use of the valid and dirty flags is described in greater detail in conjunction with FIGS. 5A, 5B, and 5C.

Figure 4A:
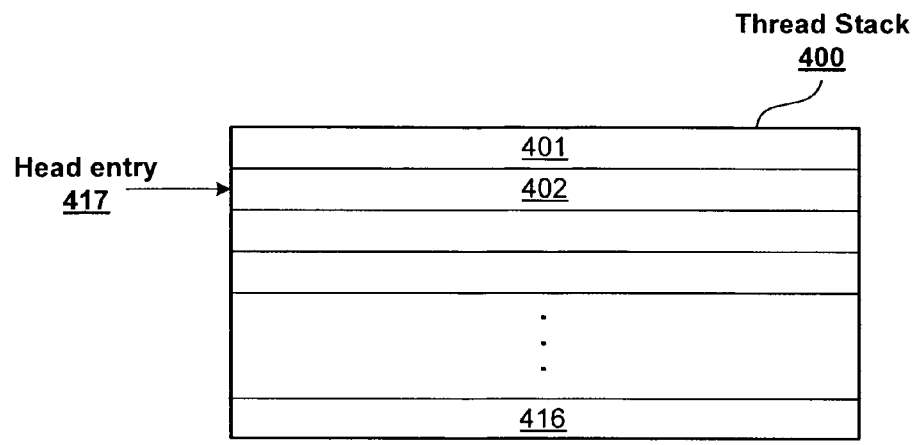
FIG. 4A illustrates a conceptual diagram of a thread stack in accordance with one or more aspects of the present invention.

FIG. 4A illustrates a conceptual diagram of a thread stack 400 corresponding to a single threadID, in accordance with one or more aspects of the present invention. Thread stack 400 includes entries for a particular threadID that are configured in a circular buffer. A head entry 417 is a pointer indicating the top of the stack entry, entry 402, for the threadID. Head entry 417 may be moved up or down to push thread execution data into thread stack 400. Head entry 417 is moved in the opposite direction to pop thread execution data from thread stack 400. Head entry 417 wraps from entry 401 to entry 416 and back as thread execution data is popped and pushed to those entries.

Figure 4B:
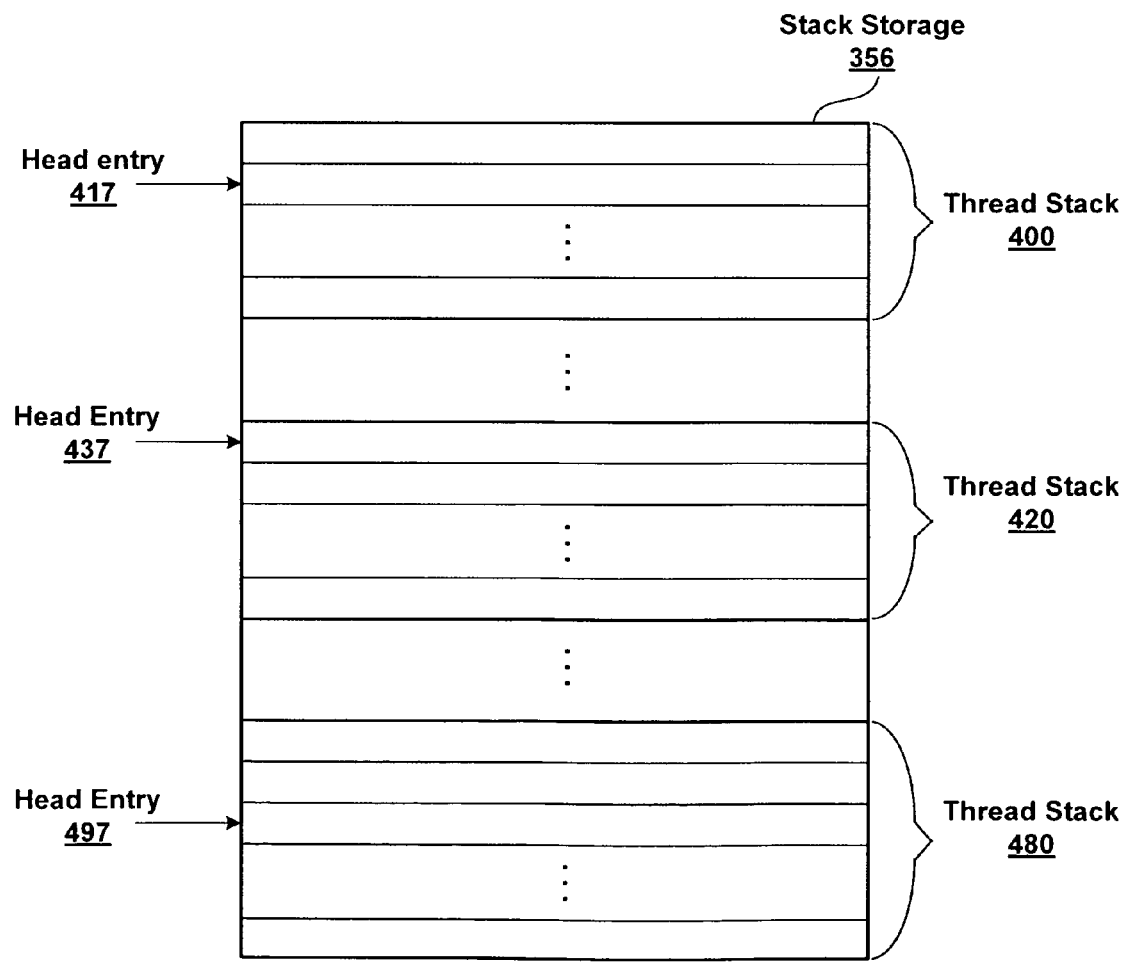
FIG. 4B illustrates a conceptual diagram of the stack storage of FIG. 3B in accordance with one or more aspects of the present invention.

FIG. 4B illustrates a conceptual diagram of stack storage 356 of FIG. 3B that includes a thread stack, such as thread stack 400, for each threadID, in accordance with one or more aspects of the present invention. An equal number of entries of stack storage 356 is allocated to each threadID. For example, thread stack 400 stores thread execution data for a first threadID, thread stack 420 stores thread execution data for a second threadID, and thread stack 480 stores thread execution data for a third threadID. Each threadID may correspond to a single thread or to a thread group in different embodiments of the present invention. Head entry 417 indicates the top-of-stack entry for thread stack 400. Similarly, head entry 437 and head entry 497 indicate the top-of-stack entries for thread stacks 420 and 480, respectively. The number of entries in a stack that are used to store data for each threadID is maintained by thread stack state unit 354. When the number of stack entries for a particular threadID exceeds the number of entries in the thread stack, e.g., thread stack 400, thread stack 420, or thread stack 480, the additional entries are stored in the remote memory.

Figure 4C:
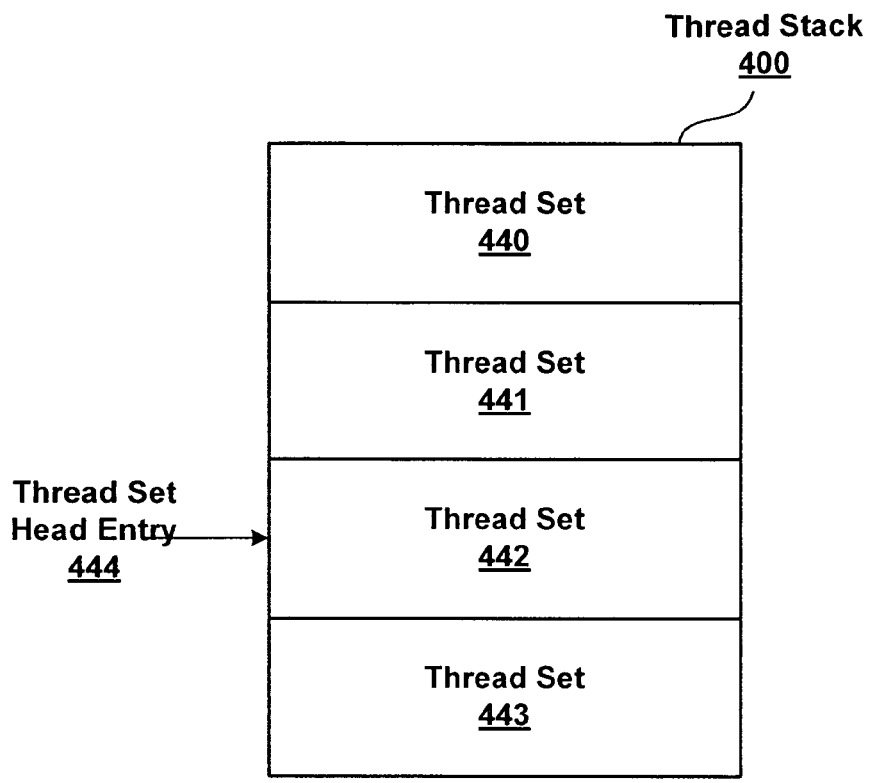
FIG. 4C illustrates another conceptual diagram of a thread stack in accordance with one or more aspects of the present invention.

FIG. 4C illustrates another conceptual diagram of thread stack 400 divided into thread sets, in accordance with one or more aspects of the present invention. As previously described, in some embodiments of the present invention, the valid and dirty flags are stored for sets of entries for a single threadID. Each set of entries is a thread set, such as thread set 440, 441, 442, and 443. In some embodiments of the present invention, a thread set corresponds to 32 bytes of thread execution data, e.g., four 64 bit entries, for efficient data transfers between graphics processor 105 and a remote memory, e.g. local memory 140, host memory 112, or the like. A thread set head entry 444 points to the thread set, thread set 442 that includes the top-of-stack entry. The set head entry 444 is equal to head entry 417 for thread stack 400, excluding the least significant 2 bits.

Rather than moving individual entries to and from the remote memory, stack cache control unit 352 moves thread sets to and from the remote memory. Moving thread sets may use the bandwidth available between execution pipeline 240 and the remote memory more efficiently than moving single entries. For example, when memory controller 120 includes a 256 bit interface between local memory 140, it is more efficient to move a single 256 bit thread set in one transaction rather than moving four 64 bit entries in four transactions. Furthermore, storing fewer bits for the valid and dirty flags, storing a flag per thread set rather than per entry, reduces the number of storage resources needed in thread stack state unit 354.

Figure 4D:
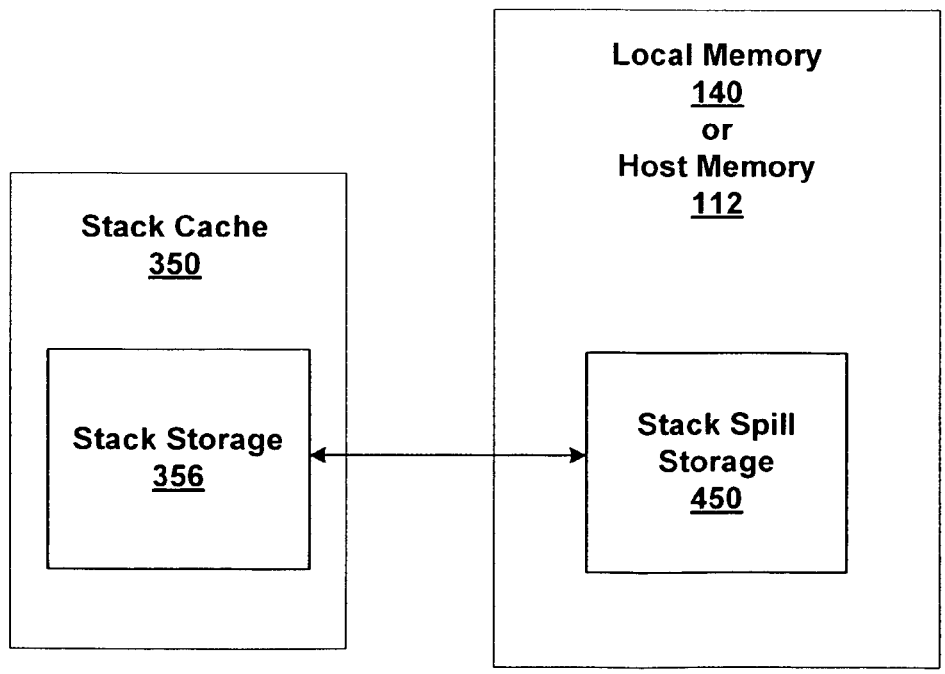
FIG. 4D illustrates a conceptual diagram including the stack cache of FIG. 3B in accordance with one or more aspects of the present invention.

FIG. 4D illustrates a conceptual diagram including stack cache 350 of FIG. 3B, in accordance with one or more aspects of the present invention. Thread execution data is moved between stack storage 356 and a stack spill storage 450 within a remote memory to spill and restore the thread execution data during the execution of one or more processing threads. Stack spill storage 450 may be allocated in the remote memory, e.g., local memory 140, host memory 112, or the like, by driver 113 based on one or more stack nesting level limit, e.g., call depth limit, imposed by an API and a stack size limit. The call depth limit applies only to call entries and limits the maximum subroutine nesting depth. The stack size limit applies to all stack entries, and limits the maximum amount of memory that can be used by stack spills, i.e., the size of stack spill storage 450. Using stack spill storage 450 to augment the storage available in stack cache 350 results in access to a larger stack capacity while maintaining low access latency since the thread execution data may be preemptively spilled from and restored to the low access latency stack cache 350 using the higher access latency stack spill storage 450.

Figure 5A:
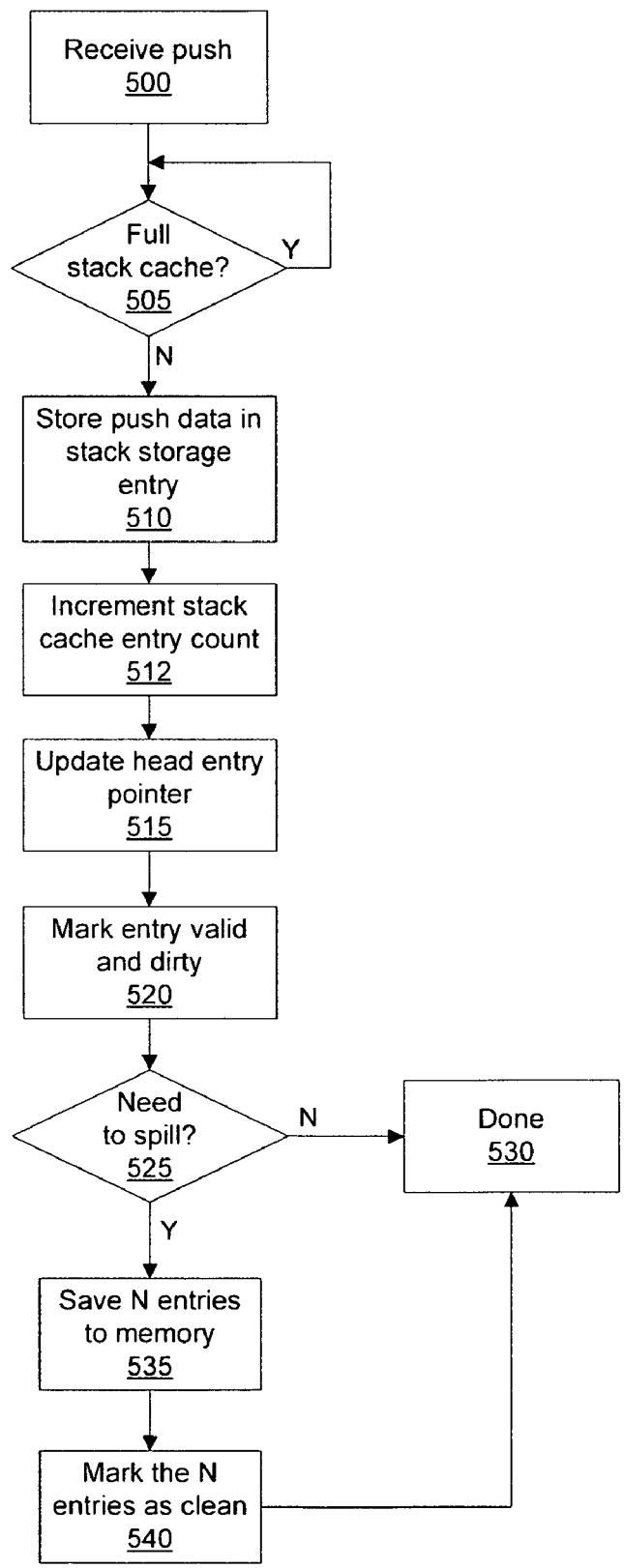
FIG. 5A illustrates a flow diagram of an exemplary method of pushing data to the stack cache of FIG. 3B in accordance with one or more aspects of the present invention.

FIG. 5A illustrates a flow diagram of an exemplary method of pushing data to stack cache 350 of FIG. 3B, in accordance with one or more aspects of the present invention. In step 500 stack cache control unit 352 receives a push including thread execution data and a threadID. In step 505 stack cache control unit 352 determines if stack cache 350 is full, and, if so, stack cache control unit 352 waits until the spill process is finished before continuing to step 510. Spilling thread execution data to stack spill storage 450 and restoring thread execution data from stack spill storage 450 may be performed while thread execution data is pushed to or popped from stack cache 350. Therefore, it is not necessary to stall pushing and popping operations during the spill and restore processes.

In step 510 stack cache control unit 352 stores the thread execution data in stack storage 356 at the entry corresponding to the head entry +1 (or −1 depending on the direction of the circular buffer) for the threadID. In step 512 thread stack state unit 354 increments the stack entry count for the threadID to indicate that thread execution data has been pushed. In step 515 thread stack state unit 354 updates the head entry pointer for the threadID to point to the entry storing the pushed thread execution data. In step 520 thread stack state unit 354 marks the entry storing the pushed thread execution data as valid and dirty.

In step 525 stack cache control unit 352 determines if a portion of the entries in the thread stack for the threadID should be spilled to stack spill storage 450. In some embodiments of the present invention, stack cache control unit 352 uses a programmable threshold value to determine if the thread stack should be spilled. The threshold value may correspond to the number of entries that store pushed data in the thread stack (valid and dirty entries). In some embodiments of the present invention, stack cache control unit 352 determines a thread set should be spilled when a thread set boundary is crossed and the next thread set is valid and dirty. For example, cache control unit 352 determines a thread set should be spilled when the first entry in thread set 441 of FIG. 4C is used to store pushed data, i.e., the boundary between thread set 442 and 441 is crossed, and thread set 440 is valid and dirty, i.e., stores unspilled data.

If, in step 525 stack cache control unit 352 determines that a portion of the entries in the thread stack for the threadID should not be spilled to stack spill storage 450, then in step 530 the push processing is complete. Otherwise, in step 535 stack cache control unit 352 moves N entries from stack storage 356 to stack spill storage 450, where N is an integer number of entries greater than or equal to one and less than the total number of entries in stack storage 356. Stack cache control unit 352 also updates a spill stack pointer stored in thread stack state unit 354 to point to the top entry for the threadID in stack spill storage 450. N may be the number of entries in a thread set or another value that is fixed or programmable. In step 540 thread stack state unit 354 marks the N entries in stack storage 356 as clean, i.e., negates the dirty flag(s) corresponding to the entries and proceeds to step 530 completing the push processing. Note that a separate state machine may be used to perform the spilling process, so that steps 535 and 540 may be completed while data is pushed onto stack storage 356.

Figure 5B:
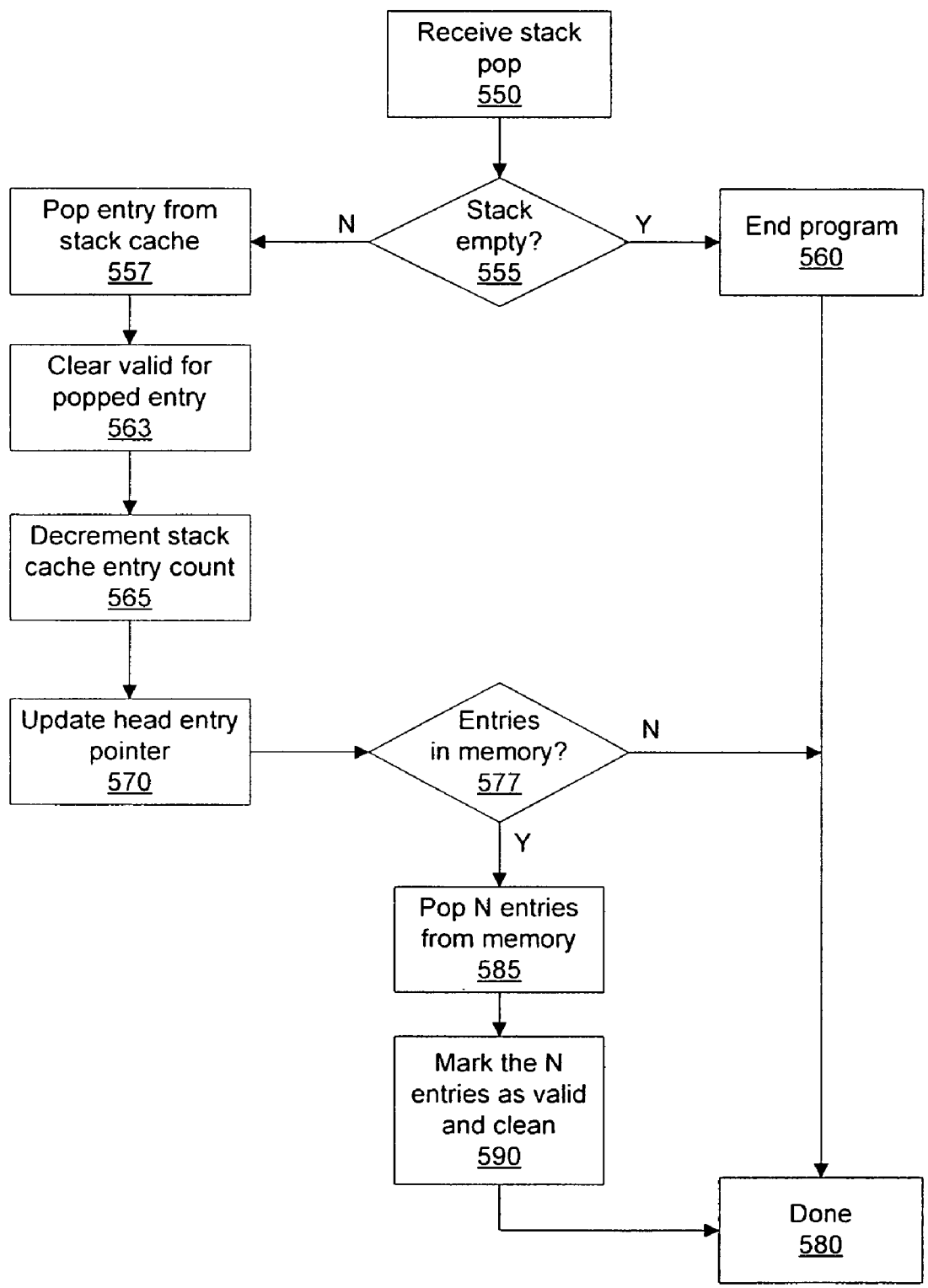
FIG. 5B illustrates a flow diagram of an exemplary method of popping data from the stack cache of FIG. 3B in accordance with one or more aspects of the present invention.

FIG. 5B illustrates a flow diagram of an exemplary method of popping data from stack cache 350 of FIG. 3B, in accordance with one or more aspects of the present invention. In step 550 stack cache control unit 352 receives a pop request for a threadID. In step 555 stack cache control unit 352 determines if the stack for the threadID is empty, i.e., if the stack entry count for the threadID is equal to 0. If the stack for the threadID is empty, then in step 560 stack cache control unit 352 ends execution of the program If, in step 555 an entry does store thread execution data for the threadID, then in step 557 stack cache control unit 352 pops the entry of stack storage 356 that is pointed to by the head entry pointer stored in thread stack state unit 354 for the threadID. Note that thread execution data for the threadID may need to be restored to stack storage 356 before step 557 can be completed.

In step 563 thread stack state unit 354 clears the valid flag for the popped entry, i.e., marks the entry as invalid. In step 565 thread stack state unit 354 decrements the stack entry count for the threadID to indicate that thread execution data has been popped. In step 570 thread stack state unit 354 updates the head entry pointer for the threadID to point to the next entry that stores pushed thread execution data. Entries that have been spilled from stack storage 356 to stack spill storage 450 remain valid until they are overwritten by pushed data and are marked as dirty. Although the entries may have been preemptively spilled to stack spill storage 450 the entries have not been overwritten and may be popped from stack storage 356 without being restored from stack spill storage 450. When an entry marked valid and clean is popped from stack storage 356, the spill stack pointer stored in thread stack state unit 354 to point to the top entry for the thread in stack spill storage 450 is updated to effectively pop the entry from stack spill storage 450.

In step 577 stack cache control unit 352 determines if there are entries in stack spill storage 459 that store thread execution data for the threadID, and, if not, then in step 580 the pop processing is complete. Otherwise, in step 585 stack cache control unit 352 pops a number of entries, N, for the threadID from stack spill storage 450 and restores the number of entries to N entries in stack storage 356 that are invalid. In some embodiments of the present invention, entries are restored from stack spill storage 450 when the number of invalid entries for the threadID is greater than a fixed or programmable threshold value. In step 590 thread stack state unit 354 sets the valid flags for the restored entries, i.e., marks the entries as valid. In step 590 thread stack state unit 354 may clear the dirty flags for the restored entries, i.e., marking the entries as clean. The spill stack pointer stored in thread stack state unit 354 is also updated to point to the top entry for the thread in stack spill storage 450 and in step 580 the pop processing and restoring is complete. Note that a separate state machine may be used to perform the restoring process, so that steps 585 and 590 may be completed while data is popped from stack storage 356.

Figure 5C:
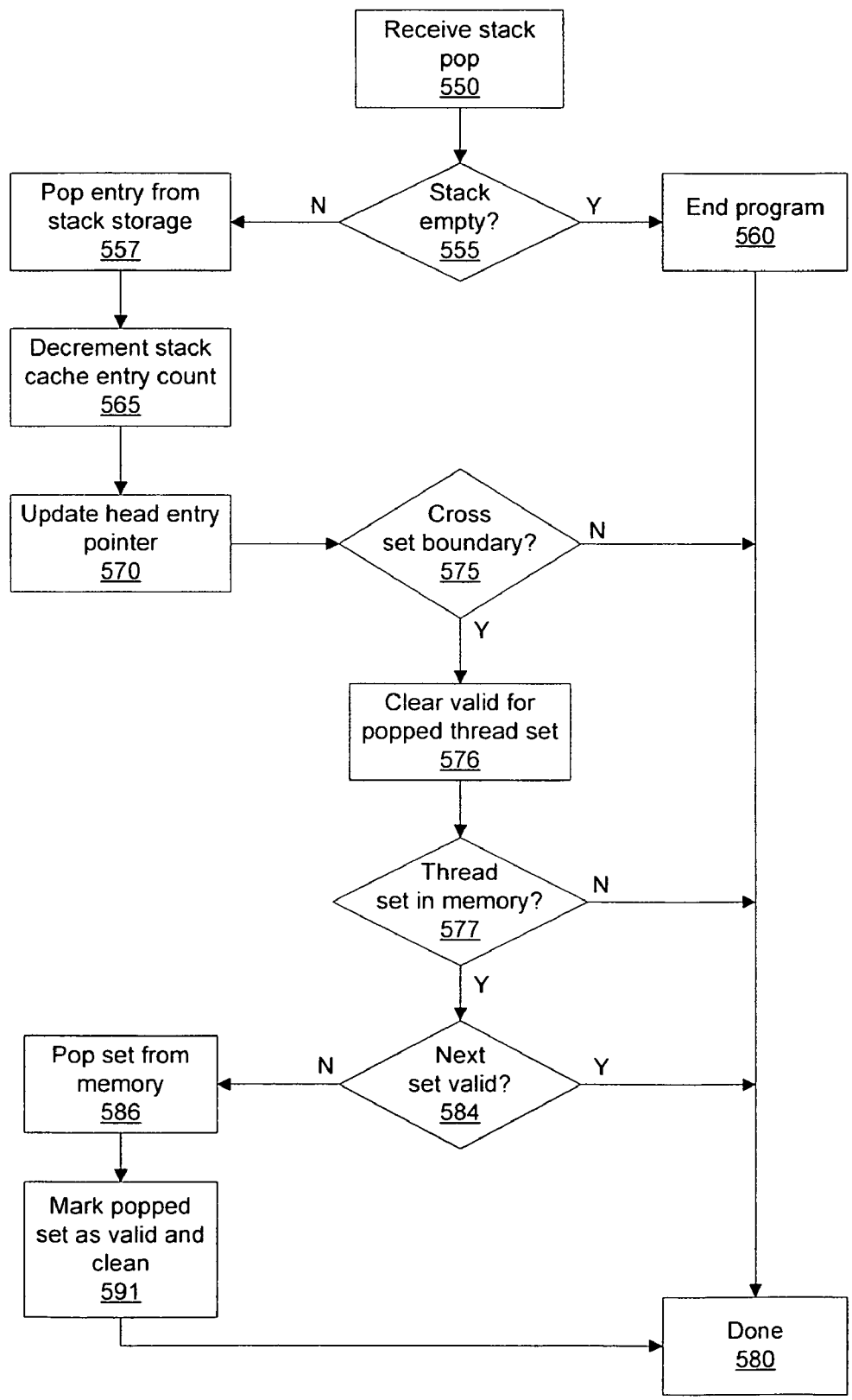
FIG. 5C illustrates a flow diagram of another exemplary method of popping data from the stack cache of FIG. 3B in accordance with one or more aspects of the present invention.

FIG. 5C illustrates a flow diagram of another exemplary method of popping data from stack cache 350 of FIG. 3B in accordance with one or more aspects of the present invention. Steps 550, 555, 560, 557, 565, and 570 are completed as previously described in conjunction with FIG. 5B. Note, that step 563 of FIG. 5B is omitted in FIG. 5C. In this exemplary method of popping data from stack cache 350 a thread set is restored with the "next lower" thread set is invalid and a thread set is spilled with the "next higher" thread set is dirty, as described further herein.

In step 575 stack cache control unit 352 determines if a set boundary, i.e., a boundary between two thread sets, has been crossed. If not, in step 580 the pop processing is complete. If however, in step 575 stack cache control unit 352 determines that a set boundary has been crossed, then in step 576 thread stack state unit 354 clears the valid flag for the popped entry, i.e., marks the thread set as invalid. When the set boundary is crossed, the last entry in a thread set has been popped.

In step 577 stack cache control unit 352 determines if a thread set is stored in stack spill storage 459 for the threadID, and, if not, then in step 580 the pop processing is complete. Otherwise, in step 584 stack cache control unit 352 determines if the next thread set is valid, and, if so, then in step 580 the pop processing is complete. When the next thread set is valid the current thread set and the next thread set each contain entries that may be popped. In this embodiment of the present invention, stack cache control unit 352 determines a thread set should be restored when a thread set boundary is crossed and the next thread set is invalid, i.e., does not store pushed thread execution data.

If, in step 584 stack cache control unit 352 determines that the next thread set is not valid, then in step 586 stack cache control unit 352 pops a thread set for the threadID from stack spill storage 450 and restores the thread set to the invalid thread set in stack storage 356. In step 591 thread stack state unit 354 marks the restored thread set as valid and clean. The spill stack pointer stored in thread stack state unit 354 is also updated to point to the top entry for the thread in stack spill storage 450 and in step 580 the pop processing and restoring is complete.

Persons skilled in the art will appreciate that any system configured to perform the method steps of FIG. 5A, 5B, or 5C, or their equivalents, is within the scope of the present invention. Stack cache 350 is used to store a predetermined number of stack entries for a thread. When additional entries are needed for the thread, entries stored in the stack cache are spilled, i.e., moved, to stack spill storage 450 in a remote memory. As entries are popped off the stack cache 350, spilled entries are restored from stack spill storage 450. The spilling and restoring processes may be performed while the stack cache 350 is accessed. Therefore, a large stack size is supported using a smaller amount of die area than that needed to store the entire large stack on-chip. The seemingly large stack may be accessed without incurring the latency of reading and writing to remote memory since entries in stack cache 350 are preemptively spilled and restored.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of storing thread execution data in a stack, comprising:
    receiving the thread execution data;
    storing the thread execution data in a first entry of the stack;
    updating a stack cache entry count that indicates the number of entries in a combination of the stack and a remote memory that store pushed thread execution data;
    marking the first entry as valid and dirty;
    updating a head entry pointer to point to the first entry of the stack;
    determining, based on the number of entries in the stack that are marked as valid and dirty and after storing the thread execution data in the first entry of the stack, that a first portion of the stack should be moved from the stack to the remote memory and marked as clean, wherein the first portion of the stack is moved when the number of entries that are marked as valid and dirty is less than the number of entries in the stack;
    moving the first portion of the stack to the remote memory and marking entries in the first portion of the stack as clean; and
    popping a second entry from the first portion of the stack without restoring the second entry from the remote memory when the second entry is marked as clean and valid.

2. The method of claim 1, wherein the first portion of the stack is a first thread set including a number of stack entries for one thread.

3. The method of claim 2, wherein the step of marking includes setting a valid flag and a dirty flag for a second thread set that includes the first entry.

4. The method of claim 1, wherein a dirty flag and a valid flag for the first portion of the stack indicate that the first portion of the stack stores valid thread execution data that has not been moved to the remote memory and further comprising the step of moving the first portion of the stack from the stack to the remote memory.

5. The method of claim 4, further comprising the step of updating the dirty flag to indicate that the first portion of the stack has been moved to the remote memory.

6. The method of claim 4, further comprising the steps of restoring the first portion stored in the remote memory to the stack by storing the first portion in a second portion of the stack that is marked as invalid and marking the second portion as valid.

7. The method of claim 1, further comprising the steps of popping the first entry of the stack and marking the first entry as invalid.

8. The method of claim 1, further comprising the step of moving multiple entries of the stack that comprise the first portion of the stack to the remote memory when the number of entries in the stack cache that are marked as invalid is greater than a programmable threshold value.

9. A method of reading thread execution data from a stack, comprising:
    receiving a request to read a first entry from the stack, wherein the first entry corresponds to a head entry pointer;
    outputting thread execution data stored in the first entry;
    marking the first entry as invalid;
    updating a stack cache entry count that indicates the number of entries in a combination of the stack and a remote memory that store pushed thread execution data;
    updating the head entry pointer to point to a second entry of the stack;
    determining, based on the number of entries in the stack that are marked as invalid and after outputting the thread execution data in the first entry of the stack, that a first portion of the stack should be restored from the remote memory to the stack and marked as clean and valid, wherein the first portion of the stack is restored when the number of entries that are marked as invalid is greater than a threshold value;
    writing the second entry of the stack and marking the second entry as valid and dirty;
    spilling the second entry to the remote memory and marking the second entry as clean; and
    popping the second entry from the stack without restoring the second entry from the remote memory when the second entry is marked as clean and valid.

10. The method of claim 9, wherein the first portion of the stack is a first thread set including a number of stack entries for one thread.

11. The method of claim 10, further comprising the step of restoring the first portion of the stack from the remote memory to the stack by copying the first portion to a second thread set that is marked as invalid.

12. The method of claim 10, wherein a thread set boundary exists between the first entry and the second entry of the stack and a second thread set stored in the stack is marked as invalid and further comprising the step of restoring the first portion of the stack from the remote memory to the stack.

13. A system for storing thread data for multiple execution threads, comprising:
    a remote memory configured to store a first portion of the thread execution data for the multiple execution threads; and
    a stack cache including:
        a stack storage configured to store the first portion of the thread execution data and a second portion of the thread execution data for the multiple execution threads,
        a thread stack state unit configured to update a stack entry count that indicates the number of entries in a combination of the stack and the remote memory that store pushed thread execution data, update a first valid flag and a first dirty flag for the first portion of the thread execution data, and to update a second valid flag and a second dirty flag for the second portion of the thread execution data, and
        a stack cache control unit configured to move the first portion of the thread execution data from the stack cache to the remote memory based on the number of entries of the stack having flags set as valid and dirty after storing first thread execution data in a first entry of the stack cache, wherein the first portion of the thread execution data is moved when the number of entries having flags set as valid and dirty is less than the number of entries in the stack, and to restore the first portion of the thread execution data from the remote memory to the stack cache based on the number of entries in the stack that are marked as invalid and after outputting the first thread execution data in the first entry of the stack cache,
    wherein the thread stack state unit is configured to update the first dirty flag to indicate that the entries storing the first portion of the thread execution data have been spilled to the remote memory when the first portion of the thread execution data is moved from the stack cache to the remote memory, and the stack cache control unit is further configured to pop an entry having a valid flag set as valid and a dirty flag set as clean from the stack without restoring data to the entry from the remote memory.

14. The system of claim 13, wherein the stack cache includes an equal number of entries for each one of the multiple execution threads.

15. The system of claim 14, wherein the stack cache control unit is configured to restore the first portion of the thread execution data from the remote memory to the stack cache when the number of entries in the stack cache that are marked as invalid for one of the multiple execution threads is greater than a programmable threshold value.

16. The system of claim 14, wherein the equal number of entries is divided into equally sized groups and the first portion includes at least one of the groups.

17. The system of claim 13, wherein the thread stack state unit is configured to update the first valid flag to indicate that the entries storing the first portion of the thread execution data have been restored to the stack cache when the first portion of the thread execution data is moved from the remote memory to the stack cache.

18. The system of claim 13, wherein the thread stack state unit is configured to update the first valid flag and the first dirty flag for the first portion when thread execution data is stored in the first portion to indicate that the stored thread execution data has been pushed to the stack cache for one of the multiple execution threads.

19. The system of claim 13, wherein the thread stack state unit is configured to update the first valid flag for the first portion when thread execution data is output from the first portion to indicate that the stored thread execution data has been popped from the stack cache for one of the multiple execution threads.

* * * * *